United States Patent

[11] 3,627,260

[72] Inventor Marvin H. Grove
 Houston, Tex.
[21] Appl. No. 864,023
[22] Filed Oct. 6, 1969
[45] Patented Dec. 14, 1971
[73] Assignee M & J Valve Company
 Houston, Tex.

[54] VALVE CONSTRUCTION
 5 Claims, 4 Drawing Figs.

[52] U.S. Cl. .................................................. 251/214,
 277/177
[51] Int. Cl. .................................................... F16k 41/04
[50] Field of Search ........................................ 251/213,
 214; 277/59, 71, 173, 177, 188

[56] References Cited
UNITED STATES PATENTS
2,278,721  4/1942  Jones.............................  251/214 X
2,747,954  5/1956  Damm et al. ..................  277/177 X
2,797,971  7/1957  Greenough.....................  277/177 X
3,171,334  3/1965  Rasmussen.....................  277/59 X
3,443,816  5/1969  Saleri et al....................  251/214 X
3,445,087  5/1969  Priese et al. ..................  251/214 X Primary Examiner—M. Cary Nelson
Assistant Examiner—David R. Matthews
Attorney—Flehr, Hohbach, Test, Albritton & Herbert ABSTRACT: A valve having a valve operating rod and sealing means to prevent leakage between the body and the rod. The primary sealing means consists of a plurality of annuluses made of nonmetallic resilient material or materials which are carried in an annular recess and which are dimensioned to form seals on their inner and outer edges. Also there is a secondary seal exterior of the primary seal and means for introducing a plastic material between the two seals. The primary seal is so constructed that it automatically relieves any excess pressure applied to the plastic material.

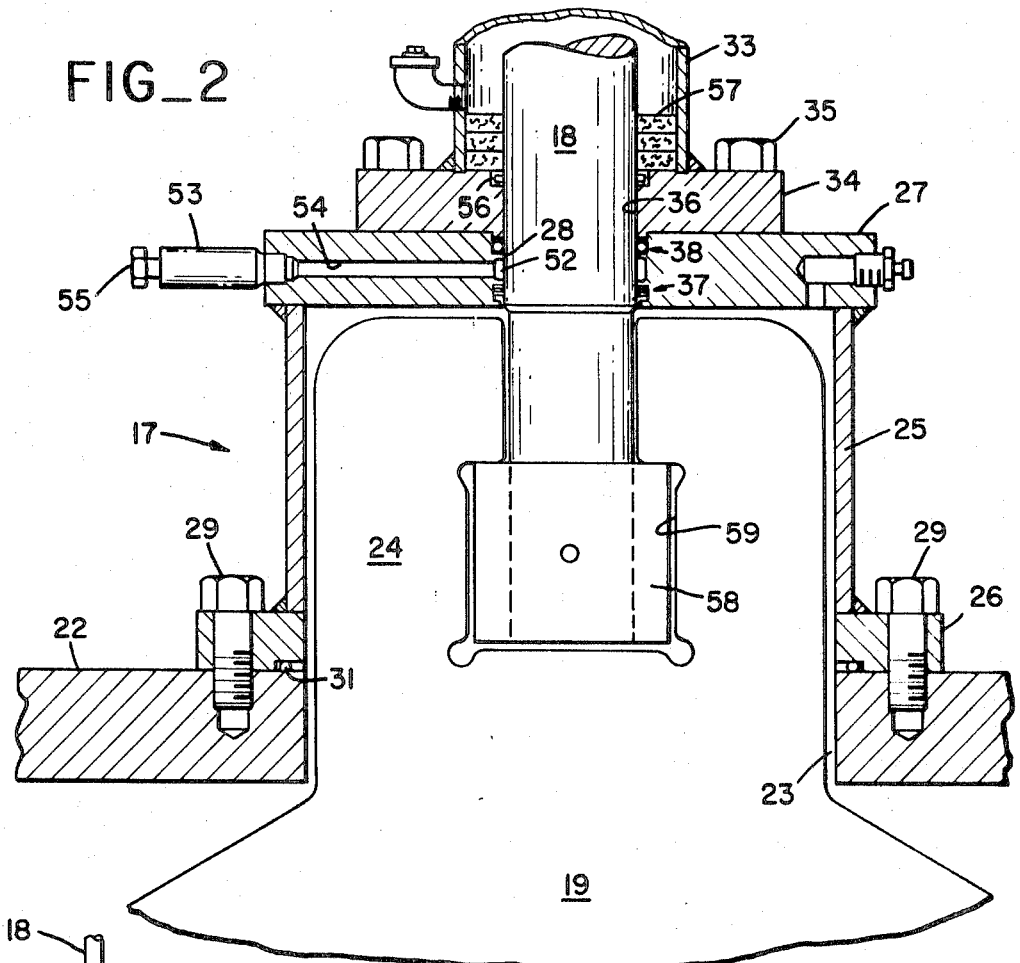

3,627,260

VALVE CONSTRUCTION

BACKGROUND OF THE INVENTION

Conventional gate valves employ a bonnet assembly on one end of the body through which the operating rod extends. The details of the bonnet assembly may vary with different types of valves, but in any event it includes a wall through which the rod extends, the wall serving to carry the sealing means. In the older designs, a so-called stuffing gland was provided to prevent leakage past the valve rod. In the more recent designs, one or more seals of the resilient O-ring type have been substituted for packing glands. Examples of such seals are shown in U.S. Pat. Nos. 3,279,747 and 3,339,882. In both examples, the bonnet assembly includes a wall at one end of the body, which is in the form of a plate, and which is bored to accommodate the valve operating rod. The bore is recessed to accommodate one or more seals of the resilient O-ring type. Sealing arrangements as just described may give satisfactory service under certain operating conditions, but under other conditions the sealing means may be subject to rapid deterioration and leakage. For example, in instances where the operating rod is connected to mechanical shodes and vibrations which tend to cause deterioration of the seal. In many critical valve installations it is not always possible to immediately repair a valve when leakage occurs. It is desirable in such instances to provide means for introducing a viscous plastic material or plastic lubricant under pressure, which will establish a satisfactory seal until repairs can be made. However, when this expedient is employed, care must be taken to avoid any serious damage to the seals, particularly, when inner primary and outer secondary seals are employed, with introduction of the lubricant into the space between the seals.

SUMMARY OF THE INVENTION AND OBJECTS

This invention relates generally to the construction of gate valves, and is concerned particularly with the sealing means to prevent leakage about the operating rod.

It is an object of the invention to provide a gate valve having novel sealing means for preventing leakage between the operating rod and the adjacent parts of the valve body, and which in particular will afford longer useful life under adverse operating conditions.

Another object of the invention is to provide a gate valve with sealing means arranged whereby a viscous material or lubricant under pressure can be applied without danger of injury to the seals.

In general, the present invention consists of a valve body having flow passages adapted to be connected to associated piping, and a valve member such as a gate within the body and movable between open and closed positions. The body includes a wall at one end thereof which may be part of a bonnet assembly, and the valve operating rod extends through an opening in this wall with its inner end connected to the valve gate. The sealing means is carried by the wall to form a fluidtight seal between the wall and the rod, and includes a plurality of annuluses assembled side by side about the stem, the wall having an annular recess serving to accommodate the annuluses. The annuluses are so proportioned that normally they are stressed in such a manner that their outer and inner edges are continuously pressed into fluidtight engagement with the peripheral surface of the recess and the surface of the rod. Preferably a secondary seal is provided and means is provided on the exterior side of the primary seal for introducing plastic lubricant or other viscous material under pressure into the space between the seals. Also the primary seal is constructed whereby it automatically relieves excess lubricant pressure.

BRIEF DESCRIPTION OF THE DRAWING

FIG. 1 is a side elevational view partly in section illustrating a gate valve of the type incorporating the present invention;

FIG. 2 is a side elevational detail in section showing the upper portion of the valve and the rod sealing means;

FIG. 3 is a detail in section on an enlarged scale showing details of the sealing means;

FIG. 4 is a detail in section like FIG. 3 showing how the primary sealing means relieves excess lubricant pressure.

DESCRIPTION OF THE PREFERRED EMBODIMENT

The gate valve illustrated in the drawing is of the fabricated body type. The body 10 is boxlike and formed from side and end walls 11 and 12 which are secured together by welding. The end walls have openings 13 forming flow passages, and are provided with hubs 14 for making connection with associated piping. The lower end of the body is shown provided with a closure plate 16, and the upper end is provided with an extension assembly 17 through which the valve operating rod 18 extends. The inner end of the rod 18 is connected to the inner valve gate 19. Annular sealing assemblies 20 are on both sides of the gate and carried by the body, thereby forming seals between the body and the sides of the gate.

FIG. 2 shows the upper extension 17 of the body, together with the means for forming a seal about the operating rod 18. The upper end of the main body part is provided with a plate 22, and in practice this plate is secured as by welding to the side and end walls of the body. The plate is provided with a central opening 23 which serves to accommodate the upper extension 24 of the valve gate 19 when the gate is in its uppermost or raised position.

The body extension 17 consists of a member 25 which is annular in section and which is provided with a lower mounting flange 26 and an upper closure wall or plate 27. The plate is provided with a central opening or bore 28 which accommodates the operating rod 18. The member 25 is shown secured to the mounting plate 22 by capscrews 29. Sealing means 31, such as one of the O-ring type, serves to prevent leakage between these parts. The plate 27 may serve as means for mounting various types of valve operators. In the event the operating means is mechanical, it may consist of a tubular yoke 33 mounted upon plate 34 which in turn is secured by capscrews 35 to the plate 27. Plate 34 is likewise provided with a bore 36 to accommodate the rods 18. Typical mechanical operating means may include a nut journaled on the upper end of yoke 33 and engaging the upper threaded portion of rod 18. The nut is rotated by mechanical gearing. Suitable hydraulic operating means is shown in U.S. Pat. Nos. 3,429,550 and 3,398,924. Where the operating means is of the hydraulic type, a cylinder is substituted for the tubular yoke 33, with the operating rod 18 having its outer end directly connected to a piston operating within the cylinder.

Two seals are provided about the operating rod 18, one 37 forming an inner seal and which is relied upon primarily to prevent leakage about the rod, and the other indicated at 38 forming a secondary seal and being on the exterior side of the seal. The construction of both these seals can be best understood by reference to FIG. 3. Seal 37 consists of a plurality of annuluses 41a, 41b & 41c which are made of a suitable nonmetallic resilient material. While all of these annuluses can be made of nylon having a durometer hardness (Shore D scale) of about 50 to 65, I prefer to make annuluses 41a and 41c of such nylon and annulus 41b of a somewhat softer resilient material such as Teflon having a durometer hardness (Rockwell) of about 112 to 120. These annuluses are accommodated within the annular recess 42 formed in the wall 27, and the machining is such that the recess is defined by the peripheral surface 43, the outer shoulder surface 44, and the inner shoulder surface 45. Surface 44 preferably is machined whereby it is in a plane at right angles to the axis of the rod 18. The surface 45 is preferably machined to provide the bevel 46. More than three annuluses can be used, such as five, three being nylon and two Teflon, the latter being interposed between the harder nylon.

Before assembly, the exterior diameter of each annulus 41 is slightly greater than the diameter of the peripheral surface 43. In addition, the inner diameter of each annulus is slightly less than the diameter of the rod 18. In typical instances these differences may be of the order of about 0.01 inch. During assembly the annuluses are first distorted and introduced into the recess 42 whereby engagement with the peripheral surface 43 tends to apply circumferential compression. The rod 18 is then inserted, and as it passes through the annuluses, it tends to put the annuluses in circumferential tension and in radial compression. It will be noted that with the number of annuluses employed (three as illustrated) the recess 42 is not completely occupied, whereby the annuluses are free to move a limited distance in a direction axially of the rod 18.

The secondary seal 38 may be of the resilient O-ring type. It can consist of an O-ring 47 formed of suitable resilient material such as synthetic rubber or elastomer accommodated within the annular recess 48. The material should be selected according to temperature and other service conditions to which it may be subjected. Thrust washers 49 and 51 made of suitable material such as nylon or Teflon can be positioned within the recess above and below the O-ring. These washers are also preferably dimensioned whereby they are normally radially compressed between the bottom of the accommodating recess and the orifice of rod 18.

The annular pocket 52 between the seals 37 and 38 is in communication with means for introducing a viscous plastic material or plastic lubricant under pressure. Thus a pressure fitting 53 is mounted on the plate 27 and is connected by duct 54 to the pocket 52. By turning the pressure screw 55 of this fitting, a plastic sealing material or plastic lubricant can be introduced under pressure into the pocket 52, and from there to the seals 37 and 38.

The bore 28 in member 27 is preferably somewhat enlarged below the recess 42. This is illustrated in FIGS. 3 and 4.

Assuming that the operating rod 18 is to be connected to an operator of the mechanical type, it is desirable to provide scraping means located above the secondary seal 38 to protect the seals against foreign accumulations which may tend to develop on the surface of rod 18. For this purpose I have shown a conventional scraper assembly 56 mounted upon the plate 34 and having a metallic scraping edge engaging the surface of the rod. Annuluses 57 are shown overlying the plate 34 and made of absorbent material such as felt or the like. These annuluses are normally saturated with a liquid lubricant for maintaining a filter of lubricant on the adjacent surface of the rod 18.

To facilitate removal of the assembly 17 together with the operating rod 18, the inner end of the rod is provided with a nut 58 which engages within the keyhole-shaped slot 59 formed in the upper extension 24 of the gate. Assuming that the gate is in raised position, removal of the capscrews 29 permits the entire assembly 17 to be shifted laterally whereby the nut 58 is disengaged from the slot 59.

Operation of the sealing means described above is as follows. When the valve is in normal use, considerable fluid pressure may exist within the valve body. The seal 37 normally receives the full pressure differential. The annuluses 41a–41c form fluidtight seals by virtue of the fact that their inner and outer edges are urged into sealing contact with the peripheral surface 43 and the exterior surface of the rod 18. When rod 18 is moved downwardly the annuluses 41a–41c assume the positions shown in FIG. 4 and when rod 14 is moved upwardly the annuluses are positioned as in FIG. 3. The applied differential fluid pressure tends to urge the annuluses to the position shown in FIG. 3. However, after the rod 18 has been moved downwardly, the body pressure is generally insufficient to cause the annuluses to be flattened as in FIG. 3. In the event it is necessary or desirable to apply lubricant or viscous sealant under pressure, either for maintenance or for eliminating leakage if it should develop, a suitable lubricant or viscous sealing material is applied by fitting 53 into cavity 52 and is effective with respect to both the inner and outer seals. If the lubricant pressure should be excessive, the annuluses 41a–41c will permit some venting of the lubricant, thus relieving the pressure as might cause injury to the seals. After introducing lubricant or sealant under pressure with some venting the annuluses 41a–41c will thereafter continue to have sealing contact with rod 18. The softer Teflon annulus between the harder nylon provides a more reliable seal with less rigid requirement concerning the finish applied to the inner and outer edges of the nylon annuluses.

It has been found that a primary rod seal of the type described above is capable of functioning under relatively adverse conditions without undue wear. Presumably this is because the annuluses 41a–41c are capable of withstanding severe usage without damage to the sealing surfaces. In addition such a primary seal is not subject to severe wear, even though the surface of the rod 18 may be somewhat roughened or pitted through usage. Application of lubrication or viscous sealant under pressure may be employed to maintain the seal in good operating condition, or it may be employed for the purpose of sealing against leakage, in the event the annuluses 41 become damaged or worn through usage.

By way of example, in one instance the rod 18 was 2 inches and the accommodating bore was 2.005 inches in diameter. The diameter of recess surface 43 was 2.368 inches and the distance between the recess shoulders was 0.20 inch. The diameter of the bore below recess 42 was 2.065 inches. Before assembly each of the annuluses 41a–41c had outer and inner diameters of 2.376 and 1.995 inches respectively and a thickness of 0.060 inch. The bevel 46 was at an angle of 45° to provide a bevel face 0.060 inch in width.

Although the seal described above has been incorporated in a gate valve, it is believed applicable to other equipment where it is desired to maintain a pressure seal about a reciprocating rod.

I claim:

1. In a valve construction, a valve body having flow passages adapted to be connected to piping, a valve member within the body and movable between open and closed positions, the body including a wall at one end thereof, a valve operating rod extending through an opening in said wall and having its inner end connected to the valve member to operate the same, and fluid pressure sealing means carried by the wall and forming a fluidtight seal between the wall and the rod, said sealing means comprising a plurality of annuluses assembled side by side about the stem, the wall having an annular recess serving to accommodate the annuluses, the recess being defined by a peripheral surface and by outer and inner spaced shoulder-forming surfaces, each of said annuluses being so dimensioned with respect to the diameter of the rod and the diameter of said peripheral recess surface whereby normally its inner and outer edges are pressed into fluidtight contact with the rod and said peripheral surface, the outer shoulder-forming surface being in a plane substantially perpendicular to the axis of the rod, said annuluses being formed of nonmetallic resilient material, the combined thickness of said annuluses being less than the spacing between said shoulder-forming surfaces.

2. In a valve construction, a valve body having flow passages adapted to be connected to associated piping, a valve gate within the body and movable between open and closed positions, the body including a wall at one end thereof, a valve operating rod extending through an opening in said wall and having its inner end connected to the valve gate to operate the same, primary fluid pressure sealing means carried by the wall and forming a fluidtight seal between the wall and the rod, said sealing means including a plurality of annuluses assembled side by side about the stem, the wall having an annular recess serving to accommodate the annuluses, the recess being defined by a peripheral surface and outer and inner spaced opposed shoulder-forming surfaces, each of said annuluses being so dimensioned with respect to the diameter of the rod and the diameter of said peripheral recess surface whereby its inner and outer edges are pressed into sealing contact with the rod and said peripheral surface, said annuluses being made of nonmetallic resilient material, secondary sealing means between the wall and the rod and located on the exterior side of the first sealing means, and means for introducing a plastic material under pressure into the space between the two sealing means.

3. A valve construction as in claim 2 in which the shoulder-forming inner surface is bevelled whereby when plastic material is introduced under pressure the annuluses are deformed against the bevelled surface whereby excess pressure applied to the plastic material is relieved by flow of plastic material between the annuluses and the rod.

4. A valve construction as in claim 2 in which some of the annuluses are harder and have a durometer hardness (Shore D scale) of about 50 to 65 and some are softer with a durometer hardness (Rockwell scale) of 112 to 120, the softer being interposed between the harder annuluses.

5. A valve construction as in claim 2 in which the spacing between said shoulder-forming surfaces is greater than the combined thickness of the annuluses.

* * * * *

PO-1050
(5/69)

UNITED STATES PATENT OFFICE
CERTIFICATE OF CORRECTION

Patent No. 3,627,260          Dated December 14, 1971

Inventor(s) Marvin H. Grove

It is certified that error appears in the above-identified patent and that said Letters Patent are hereby corrected as shown below:

Col. 1, line 22, after "mechanical" delete "shodes" and insert --operating means, the rod is subjected to mechanical shocks--; col. 3, line 44, delete "filter" and substitute therefor --film--.

Signed and sealed this 6th day of June 1972.

(SEAL)
Attest:

EDWARD M. FLETCHER, JR.          ROBERT GOTTSCHALK
Attesting Officer                 Commissioner of Patents